United States Patent [19]
Alexandre et al.

[11] 3,768,599
[45] Oct. 30, 1973

[54] METHOD AND MEANS FOR ADDITIONALLY IMPROVING THE STABILITY AND TRACTION OF VEHICLES ESPECIALLY IN BRAKING

[76] Inventors: Pierre Alexandre, 27 rue Lepic; Renee Lezy, 42 rue de Cronstadt, both of Paris, France

[22] Filed: Feb. 14, 1972

[21] Appl. No.: 226,155

Related U.S. Application Data
[63] Continuation-in-part of Ser. No. 162,582, July 14, 1971, abandoned.

[52] U.S. Cl. .................................. 188/5, 188/2 R
[51] Int. Cl. ............................................. B60t 1/14
[58] Field of Search .................. 180/115; 188/2 R, 188/5, 270

[56] References Cited
UNITED STATES PATENTS
| | | | |
|---|---|---|---|
| 1,698,482 | 1/1929 | Nicin | 188/5 UX |
| 3,167,154 | 1/1965 | Salvetti | 188/5 |

FOREIGN PATENTS OR APPLICATIONS
| | | | |
|---|---|---|---|
| 1,159,866 | 2/1958 | France | 188/5 |

*Primary Examiner*—Duane A. Reger
*Attorney*—N. Jerome Rudy

[57] ABSTRACT

The stability to the ground and road-hugging, tractive capability and efficiency of vehicles, especially automobiles and particularly during braking, is materially increased and improved by a method and means operable during braking and deceleration of the vehicle whereby and wherein an air scoop or air collecting and gathering depression chamber or device comprised of at least one movable flap which is positioned towards the rear end of the vehicle and against the direction of travel is lowerable downward from the floorboard of the vehicle toward the ground so that, in combination with associated and integral means, a vacuum or suction effect is tended to be created and made between the bottom of the vehicle and the ground or roadbed over which it is traveling in order to result in and provide a positive force and influence to keep the vehicle from skidding, twisting or otherwise deviating in its course over the roadbed.

33 Claims, 15 Drawing Figures

METHOD AND MEANS FOR ADDITIONALLY IMPROVING THE STABILITY AND TRACTION OF VEHICLES ESPECIALLY IN BRAKING

This Application is a Continuation-in-Part of Co-pending Application for United States Letters Patent having Ser. No. 162,582, filed July 14, 1971, now abandoned.

DESCRIPTION AND CHARACTERIZATION OF INVENTION

This invention pertains to a greatly improved method and means for increasing the stability, traction and road-hugging ability and performance of various vehicles, especially automobiles, and particularly during braking.

It is known that for all types and sorts of vehicles and, in particular, for automobile vehicles and adherence or traction to the ground results from the friction of the wheels on the ground. This traction or adherence is a function, on the one hand, of the co-efficient of friction of the surfaces which are present and in engaging contact and, on the other hand, of the pressure exerted by the vehicle on its rotational components or wheels and more precisely, on the zones or areas of contact of these mechanical organs or components with the ground. It has already been well demonstrated that when the displacement speed of the vehicle increases the adherence or traction during braking decreases so that the braking or forced deceleration of the rotation of the wheels is less efficacious and may actually be ineffective and resultant of an increased vehicular speed. This of course, constitutes a serious danger and safety hazard for any vehicle, particularly when high speed travel is involved.

The primary purpose of the present invention is to provide greatly improved means, including a method, for benefitting and improving the adhesion to the ground or roadbed and the traction of vehicles at the moment of the braking so as to readily augment or increase the vertical force exerted by the vehicle on the areas of contact between the rotational components or wheels of the vehicle and the ground or other roadbed over which the vehicle is traveling in order to give and achieve considerable improvement in traction. This results, through the action of the thereby-caused natural forces, in more efficient and effective braking of the vehicle with minimized fear or danger of skidding because and in consequence of possible blocking or obstruction of the rotational components of the vehicle during the braking and forced deceleration thereof.

Another equally important purpose of the invention, as is above indicated, is to provide apparatus in a vehicle for accomplishment of the mentioned method and means.

These and other purposes and objectives of the present invention are apparent and readily discernable in the following description and specification.

According to the invention, better adhesion and traction to the ground of any given vehicle, particularly an automobile, especially at the moment of and during braking thereof, is achieved by a method and means whereby and wherein the lower part (or floorboard) of the vehicle is so arranged that in effect it can be and is delimited or reduced in space volume between itself and the ground or other roadbed over which the vehicle is traveling or is displacing itself. This is accomplished by use of a depression chamber under, and as an integral part of, the lowermost part of floorboard, particularly towards the rear end, of the bottom of the vehicle. The depression chamber or element employed for accomplishment of the purposes and objectives of the present invention is characterized in that at least one area of the partition or wall thereof has at least one downwardly moveable flap or shutter or window with the chamber being open or openable at its window portion in any portion thereof. The said flap or flaps of the chamber form, when open, at least a convergent assembly point in the form of a dihedral or scoop-like mechanism which is open, when opened, at its larger end towards the direction of travel of the vehicle. Additionally, a divergent opening to the rear of the direction of travel of the vehicle and connected at its smallest portion with the neck of the convergent may be utilized. In any event, the passage of air into the chamber and therethrough tends to create or make a suction or vacuum effect between the bottom of the vehicle and the ground over which it is traveling so as to considerably augment its stability on the traction with the ground, especially during braking.

In one manner of practice of the present invention, the air alimentation or feed or input of the air and into the convergent chamber is made and assured by the layers of air that are found and present between the floorboard of the vehicle and the ground on which the vehicle is situate and over which it is being displaced. During the braking or forced deceleration action of the vehicle, the movable flaps or windows or shutters which form a convergent and possibly, in addition, divergent chamber under and with the floorboard of the vehicle are actuated; this being in the form of an opening of such flaps. This opening or extent of opening of the flaps is made in appropriate proportion to the rate of speed or displacement over the ground of the vehicle relative to the ground on which it is traveling. The air masses entering the front end or intake area of the convergent part, which may be the sole part, of the chamber are pushed therein by the forward movement of the vehicle and the speed of this entering air is increased as it goes up to the neck or throat of the convergent chamber. In other words, the intake pipes, as it were, formed by the chamber, of the vehicle and between this bottom and the floorboard of the vehicle.

There then occurs as a result of the masses of air flowing rapidly through the chamber to the opening disposed at the upper end of the convergent chamber or to the opening at the end of and behind the depression chamber (if one is employed) an exhaustion or suction of air which causes a depression in the interior of said chamber. The air velocity actually increases as it passes through the convergent chamber assembly (or, if one is used the convergent/divergent assembly) until it reaches the final opening where a blast-like effect at the exit point is then produced. The totality of the air arriving at the neck or throat of the convergent part of the chamber is, as indicated, ejected and evacuated at or towards the rearward part of the vehicle. Of course, when a divergent portion is utilized in the chamber, the air passes rearwardly through a gooseneck sort of passage from the front convergent part of the chamber to the rear divergent section. In any event, resulting air pressure depression causes the existance of a strong and significant vertical force which tends to act upon and flatten the vehicle towards and in a more even or flat plane with the ground over which it is traveling; pressing it in that direction so as to increase the adhesion of the vehicle to and its traction with the ground. In this way, there is realized a more effective braking or slowing of the wheels of the vehicle during forced deceleration so as to minimize the possibility of skidding, weaving and other deviations in the course of travel of the vehicle.

It should be noted and taken into account that the suction or aspiration or exhaustion energy of the air in the depression chamber is necessarily obtained at the detriment and expense of the kinetic energy of the vehicle itself so that, inherently, practice of the present invention provides some brakage and stoppage of the vehicle. Furthermore, it can also be seen and appreciated that the mobile flaps (or shutters or windows) used in the chamber means of the present invention can be made to come in actual contact with and rub on the ground to additionally augment and increase the desired braking force effort and effect.

The present invention has equally for its goal, as a new industrial product and as is indicated in the foregoing, the singular and various forms of apparatus necessary for practice of the invention. This apparatus in each and every of its advantageous embodiments, along the lines above described, involves at least one movable flap (or mobile shutter or window) disposed between the ground over which the vehicle travels and the lower surface of the floor board of the vehicle; with these one or more flaps in combination with the floorboard or other bottom of the vehicle defining at least a convergent and, optionally and possibly, a divergent chamber or chambers. The chamber or chambers are put together by joints that turn around about an axle which is at least roughly perpendicular to the longitudinal axis of the vehicle. The flap or flaps are connected by means permitting and making it possible to have assurance of their rotation around and about the mentioned axis, and allowing them to come by their area opposed to the connecting or turning area, in proximity to or in contact with the ground on which the vehicle travels. Some of the longitudinal wall or partition is thus laterally limiting the defined volume between the mobile flap or flaps and the ground. The articulation or connecting turning axles of the movable flap or flaps are inclined and moved and attached directly or not onto the floorboard of the vehicle or by and onto an axle-tree, wheel shaft, wheel spindle or actually to one of the wheels of the vehicle itself.

In one embodiment of the invention, the depression chamber is defined and delimited on the one hand by means of a longitudinal wall or partition and, on the other hand, by means of two movable flaps which form and constitute, together with the floorboard or other bottom of the vehicle, a convergent for one part and for the other part a divergent; the opening of the depression chamber being disposed and so arranged in the dead-end area of the convergent-divergent. The lateral longitudinal walls of the apparatus are comprised of pliant, supple, flexible bands or strips which are placed side-by-side with and fastened to the lateral borders or rims of the movable flaps and attached to and fixed on the lower surface of the floorboard of the vehicle. The said bands have their lower rim or border surface disposed to and arranged in immediate proximity or contact with the ground on which the vehicle travels. Each movable flap is subjected to the action of a torsion spring which stretches and tends to make the flap come into contact with the ground; the said torsion spring having a fixed point connected or joined to the floorboard of the vehicle or to an interdependent, i.e., integral, element of this floorboard or bottom. The pivoting of the mobile flaps subjected to the torsion spring is provided by raising, lifting or hoisting cables that hang or are suspended and are fastened in the area of the movable flaps which is relatively removed or distant from the turning or articulation or connecting axles of said movable flaps. The movable flaps delimit, by their inclusive transversal borders or edges located between their articulation axles, constitute an opening that extends over the entire width or total length of the width included between the two flexible lateral bands of the device apparatus. Opposite the mentioned openings there is a sectional iron cap or shaped cowl arranged on the bottom or the floorboard of the vehicle having for its purpose the improvement of the flow of the air streams at the level of the neck or dead-end of the convergent-divergent formed by the flaps and the bottom or floorboard of the vehicle.

The air conveyance mains or channels, or air input passages, are arranged and provided in the vehicle between a frontal area of the vehicle and the inlet or entrance area of the convergent of the apparatus according to the invention. The movable flaps are made up of longitudinal counter-braces or bands, which may be of metal, with said bands being connected or joined and fastened transversely to one another by flexible bands which may be made of rubber, plastic or the like; the whole unit forming a continuous surface.

In a primary variation of the above-mentioned embodiment, the part of the movable flap or flaps which is designed and intended to proximate to and come near or make an actual contact with the ground is made in the form of a shoe or in the form of skids adapted to just rub or scrape against the ground when the movable flap is maneuvered and activated at the moment of braking.

In another variation of the above-mentioned and described embodiment of the invention, the movable flaps are equipped in the portion or area thereof that is designed to come near or in proximity to or be in actual contact with the ground with relatively small-diameter friction rollers. These friction rollers have axles which may or may not be perpendicular to the longitudinal axle of the vehicle.

As should be apparent, the assurance of optimum results and good efficacy of the device according to and in practice of the present invention is better facilitated when the depression chamber formed and delimited by the movable flaps is so displaced as to give maximum depression. This is achieved by using as low a position as possible during the braking and forced deceleration operation. In order to do this, as indicated, it is necessary that the lower borders or edges of the flexible lateral bands and the edges of the movable flaps which can come near to or be in contact with the ground are disposed, when they are in functioning or working position as close to and with as little distance as possible between the lowermost extremity of the device and the ground. For example, it is most advantageous if the indicated clearance or play is in the neighborhood of between about two and about ten millimeters.

The working or maneuvering apparatus of cables assuring the raising of the movable flap or flaps when braking or forced deceleration of the vehicle is not being invoked can be accomplished by a driving wheel apparatus that has been linked or associated directly with these cables and which is the driving wheel apparatus or control for the brakes or, alternatively, by an independent driving wheel or other control.

In a second embodiment of the invention, the depression chamber is delimited by means of a single mobile flap which forms with the floorboard or other bottom of the vehicle a convergent in the form or shape of a dihedral angle which, preferably, is linked or associated at the front to a divergent which also is in the likewise form of a dihedral angle. Opposite the top of the first dihedral mentioned the opening of the depression chamber is found or situate and constituted in the dead-end area or neck of the convergent and/or behind the sole mobile flaps, window or shutter. The lateral, longitudinal walls of the device are comprised of flexible bands which are arranged side-by-side on the lateral edges of the movable flap and coupled and fastened on so as to be fixed to the lower surface of the floorboard of the vehicle. The bands have their lower borders or edges disposed in immediate proximity to or in contact with the ground upon which the vehicle is located or over which it is traveling. The movable flap is subject to the action of a spring, for example, a torsion spring which extends and stretches so as to tend to make the flap have contact with the ground. The spring has a fixed point fastened to and linked with the floorboard of the vehicle or to an integral element of the floorboard or vehicle bottom. The pivoting of the movable flap, subject to the action of the spring, is provoked and brought about by raising or lifting cables for hoisting that hang and hook so as to be suspended in an area of the movable flap relatively far away from the articulation or turning axle of the mobile window.

Some air conveyance mains or input channels are arranged and provided in the vehicle between the front area or zone of the vehicle and the inlet or intake entrance area of the convergent which is defined between the movable flap and the floorboard of the vehicle.

The movable flap is composed of longitudinal bands, which advantageously may be of metal, the said bands or counterbraces being joined and fastened between themselves in transverse connection by flexible bands which may be made of rubber, plastic material or the like.

The whole assembly or unit forms a continuous surface, with at least one wire gauze or fabric or wire guard mesh or grill being disposed between the floorboard or other bottom of the vehicle and the ground on which the vehicle is located or over which it travels. All of this is behind the area where the movable flap is found taking into account the direction of forward advance or progress of the vehicle.

In one primary variation of the second embodiment of the invention as is above described, the movable flap of the defined assembly at the time or moment when its forward edge border comes in contact with or in proximity to the ground, there is only a single convergent for the air or air layers to pass into between the floorboard of the vehicle and the ground.

In another variation of the second embodiment, the movable flap of the device, when its forward edge is in contact with or near the ground, forms, on the one hand, a convergent and on the other hand, a divergent. These two areas are separated by a dead-end area located roughly to the right of the turning axle of the movable flap. The divergent area is much shorter than the convergent area. In this case it is possible to have in the dead-end area at least one opening made in the movable flap which will in effect and as a matter of fact, cause the dead-end or throat to be connected with the mass or volume placed below the movable flap. In case at least one opening is made in the dead-end area, a section or piece of textile or a grill supported by the movable flap can be disposed and arranged between the mentioned opening and the ground.

It can be observed that in the foregoing embodiment, the textile piece or mesh section, or protection grill, make it possible to filter the air which passes through the convergent or the convergent/divergent of the device as well as filtering the air which is drawn into the depression chamber. This filtering takes place before the air escapes through the back of the vehicle. In this way, if solid particles are carried along by the air flow in particular at the time of aspiration or drawing of air into the depression chamber, these particles will not be violently ejected behind and from the rear of the vehicle.

It is clear that the same advantage can be obtained by means of the protective fabric or wire gauze or grill, regardless which design of the device is made in accordance with the invention.

The present invention may also have as its object, by way of new industrial product, the provision of a device according to the invention of the type that is above-defined, characterized by the fact that at least one protective fabric or grill is arranged into the trajectory of the air flow drawn into the depression chamber and in front of the aspiration opening located in the dead-end area or throat and/or after the divergent area which is defined and formed by the movable flap or flaps. If such a means of filtration is arranged in front of the opening between the turning axles, it is preferably fastened to and mounted on the bottom of the vehicle by means of an attachment which passes through the above-mentioned opening. If the filtration means is located in front of the divergent, it may advantageously be made up of a piece of fabric or wire gauze or a grill attached to the floorboard or other bottom of the vehicle and arranged in a vertical manner or in a slanting or oblique manner between the lateral bands which form and constitutes the depression chamber.

It has also been shown and proven that by causing the distance of the open end of the flap or of the flaps of the device to vary with respect to the ground, as by pivoting the flap or flaps around the turning axle, one causes the given speed, at any given speed, of the vehicle to vary or change the vertical force which is exerted on the vehicle. According to the present invention, the movable flap or flaps of the device are placed into the intermediary position without braking the car so as to increase the support force or traction of the said vehicle on the ground and thus increase and enhance its traveling stability particularly when the vehicle is going at a high rate of speed.

The present invention therefore also has as an object, likewise by way of new industrial product, a device according to the invention such as is defined above, which device is characterizable in that the movable flap or flaps can if desired be maintained in an intermediate position between their extreme uppermost and lowermost positions by virtue and reason of a maneuverable lockage or intermediate flap-positioning means which is located in the interior of the vehicle and independent of the vehicle's brakes or the braking mechanism for the vehicle.

In case the turning axles of the movable flap or flaps are attached to the bottom of the car or other vehicle, the vertical force which makes it possible to improve the adherence and traction of the vehicle, particularly at the time of braking is exerted on the turning axle or, in other words, on the bottom of the automobile vehicle. From this there is produced and obtained an increase in adherence or traction causing, at the start, a certain scraping of the suspension since the complementary vertical force obtained from the depression chamber is exerted on the frame of the vehicle itself and not directly on the wheels. Therefore, provision has been made in a third embodiment of the invention for causing the force coming from the depression created in the depression chamber to be exerted directly on the wheels so that the suspension is not subjected to the action and deleterious action of complementary force.

Thus, a third embodiment of the device according to the present invention and in a third method for utilization of the corresponding process, the turning axle of the movable flap or flaps is attached, directly or not, to the axle, spindle of the wheel or to one of the wheels of the vehicle.

In a preferred variation of this third embodiment, the turning axle of the movable flap or flaps is engaged in the supports which can be built integrally into the protective cover or housing of the wheel axle. The supports are made up of two parts which can be assembled and put into place around the wheel housing without making it necessary to take the wheels apart. Each support is made up of at least one housing inside of which one end of the turning axle of the movable flap is pivotable. The movable flaps are made up of a flexible material, as indicated and specified for the first design or embodiment of the invention as is above-explained, and the axle of the movable flaps is held in their articulation or turning housing by means of a screw or pegs, the latter being inserted into a circular opening of the turning axle.

It can be seen that with an apparatus made according to the third embodiment of the invention, the force obtained by virtue and as a result of the depression which exists and predominates in the depression chamber is exerted directly onto the wheels of the vehicle without the interposition of or effect on the suspension element of the vehicle. The result of this is that, at the moment when the movable flap is in place in working position so as to form the necessary convergent/divergent, the vertical force is exerted on the wheels or other rotating elements of the vehicle and causes an increase in the actual area of their surface contact with the ground.

Now then, it is known that for presently available and currently popular pneumatic tires for automobiles and other vehicles, it is readily possible to double the surface contact of the tire with the ground if appropriate force and load pressure is employed on the tire. Thus, under such circumstances and actualities, it can easily be appreciated that utilization of apparatus according to the present invention with one or two movable flaps embodied therein, one can readily double the adherence and traction of the vehicle. If the use of the movable flap or flaps of the device according to the invention is done at the moment or during the time of braking it is possible with minimized risk of sliding or other deviation in the course of travel due to locking of the wheels to increase considerably the effectiveness and reliability of the forced deceleration in braking. It should be additionally taken into account that the efficacy of apparatus in accordance with the present invention is enhanced and increased and becomes all the greater as the speed of the involved vehicle increases or is at a higher rate.

Moreover and as is also apparent, placement of the movable flap or flaps of the apparatus of the invention on the rear axle of an automobile vehicle will at least partially compensate, at the moment and during the time of the functioning and operation of the device, for the unballasting and lurching effect of the rear axle which is normally and ordinarily produced at the time of braking. It is known and a common phenomenon that, in the braking the forced deceleration of automobile vehicles, it is generally of and with greater effect and importance on the front tires than on the back ones. Generally, the slowing down during forward deceleration causes the vehicle to rise in the back with respect to the back axle or the back wheels. Thus the back wheels have and assume a lesser load during braking. With use of a device according to the invention, an optimum distribution of load onto and between the four wheels of the vehicle can be achieved and most advantageously re-established.

As is apparent, the characteristics corresponding to and inherent in the embodiment of the invention as above-explained can advantageously be used in combination with those corresponding to and employed in the first or second embodiments as are set forth in the foregoing.

A beneficial fourth embodiment of the present and corresponding apparatus invention has as its particular highly advantageous object a process that makes possible to greatly increase the adherence to the ground and traction of vehicles of all types and, in particular, of automobile vehicles. This particular embodiment of a process according to the invention creating on the lower part of the vehicle (between the bottom of the vehicle and the ground on which it is located) a depression chamber marked off by means of a shutter, moveable or fixed, the shutter or shutters thus forming together with the bottom of the vehicle an open convergent towards the front of the vehicle, possibly followed by a divergent made up of a dihedral opposite the top of the convergent dihedral. The opening of the depression chamber thus formed makes up an intake area of the convergent and/or behind the divergent zone. The turning axles which can be associated with the shutter or shutters, when they are moveable, are mounted either on the bottom of the vehicle or on the axles, the wheel axles or the wheels of the vehicle.

This particular process is characterized by the fact that the opening of the depression chamber in the convergent zone is accomplished under the protection of and has therein at least one shaped cowl open towards the back of the vehicle. The said cowl or cowls are mounted on a support on which is found the possible turning axle of the shutter which constitutes the convergent.

In a first method of using this particular variation of the process, the input of air for the convergent is assured and obtained only by the layers of air which are enclosed between the bottom of the vehicle and the ground on which the vehicle is located. In a second variation, the input of air for the convergent is completed by an air input due to and created by the presence of some channels which open into the entry area of the convergent. These channels thus cause layers of air to intervene, which air layers correspond to those found in the front area of the vehicle and above the bottom of the vehicle.

In a preferred method of practice of the invention, the ratio of the entry section of the convergent dihedral to the intake section of this dihedral is between about 1.2 and about 2.5 and preferably between about 1.5 and about 2.

The present invention and as indicated also has as a particularized object a device making it possible to use the last above-described process. This device or apparatus, at least one moveable shutter arranged between the bottom and the lower surface of the bottom of the automobile vehicle. This moveable shutter thus defines, together with the bottom, a convergent open towards the front of the vehicle which turns on an axle roughly perpendicular to the longitudinal axle of the vehicle. The said convergent can possibly be followed by a divergent likewise made up of a moveable shutter turning in the same way as the shutter of the convergent. The moveable shutter or shutters are and can be thus associated with some means making it possible to assure their rotation around the above mentioned axles. They are thus able, by means of their area opposite the articulation area so as to be able to come close or in contact with the ground on which the vehicle is located.

The longitudinal walls laterally limit the volume defined between the above-mentioned moveable shutter or shutters and the ground. The articulation or turning axles of the moveable shutter or shutters are attached (directly or not) either into the bottom of the vehicle, or on an axle, a wheel axle or a wheel of the vehicle. This device is characterized by the fact that the axle (or the turning axles) of the moveable shutter or shutters is (or are) mounted on a support on the inside of which at least one opening is made which connects with the intake area of the convergent. The volume involved is defined between the moveable shutter or shutters and the ground with each opening having within it and being protected by a shaped cowl located in the intake area and opened in the direction in the back of the vehicle.

In a preferred method of realization of this particular embodiment of the invention, the depression chamber which is made up by the volume defined between the moveable shutter or shutters and the ground will connect with the intake area by several openings which are regularly distributed along the length of the support placed within the said intake area. Thus, each shaped cowl has, when viewed on the plane surface, the form of a shell whose point is directed towards the front of the vehicle.

In a still further variation, the device according to the invention includes two moveable shutters hinged on both sides of the support which are placed within the intake area. The shutter of the convergent is thus formed together with the bottom of the vehicle when its free extremity is in the vicinity or in contact with the ground. An angle between 15° and 20° is usually employed for this. The support of the shaped cowl includes (towards the back and starting with the surface of the open extremities of the cowls) an inclined surface advantageously forms an angle of about 7° with the bottom of the vehicle although, as is apparent, other angularities can also be employed. This is all open towards the back of the vehicle. A moveable shutter is hinged at the end of the inclined plane which comprises the support situate at the intake. The angle thus formed by this shutter with the bottom of the vehicle when its free extremity is near or in contact with the ground, is usually greater than about 15°. The moveable shutter thus constitutes the end of the divergent of the device and is free to rotate around its axle.

In yet another variation the apparatus according to invention only includes a single movable shutter constituting the convergent. In such a form, the moveable convergent shutter will make the bottom of the vehicle an angle of approximately 15° to 20° when it is in use. At the right of each shaped cowl protecting an opening of the depression chamber, the support placed within the intake area constitutes an aileron which will favor and greatly facilitate and improve aspiration in the depression chamber.

The present invention also includes a further simplified device making it possible to take advantage of and put into use the herein described process. This device includes a single moveable shutter turning around an axle which is roughly perpendicular to the longitudinal axle of the vehicle. This shutter of the device is associated with some means for making it possible to assure its rotation around the axle which supports it and which, by means of its area opposite the turning area, will make it possible to come near or in contact with the ground on which the vehicle is located. Some longitudinal walls laterally limit the volume defined between the moveable shutter and the ground. These are characterized by the fact that from the intake area of the convergent they are in the form of a dihedral defined by the single moveable shutter. The bottom of the vehicle is thus deformed in the direction of the back of the car towards the top or towards the bottom in order to modify the orientation of the streams of air which are thereby caused to flow in.

It is clear that one can readily provide for and take advantage of the various devices of the present invention according to various techniques and means of embodiment and usage that are available. Thus, one can use the device not only in a high, inactive position but also in a low, active position of the convergent moveable shutter. Also, one or more intermediate positions (between the top and bottom limits) making it possible to improve in a permanent manner the stability and adherence to the ground of the moving vehicle to which the device is attached.

According to the essential goal and object sought for by installing a device according to the present invention in a vehicle, a person skilled in the art will easily be able to choose the most desirable form of embodiment to be utilized from among the different variations available.

When a device utilized solely for braking is employed, it is significant that the drag of the device be as great as possible. On the other hand, if the primary desire is to have permanent and continuous improvement in the stability and tractive adherence to the ground of the vehicle under movement it is preferable that the drag of the device be minimal. Additionally, if one wishes for a permanent improvement in the stability and adherence to the ground of the vehicle under movement, then according to practice of the present invention, one can provide a fixed shutter of the device which will define a convergent to secure the advantages and benefits of the invention.

The present invention therefore also and still further has amongst its objects a device making it possibly to increase in a permanent manner the adherence to the ground of vehicles. This device is characterized by the fact that it is made up of a sixth shutter which is placed on the bottom of the vehicle and thus defines together with the vehicle a convergent which is open towards the front of the car. The convergent dihedral thus formed is laterally limited by longitudinal walls which are capable of coming close to or in actual contact with the ground. The said shutter can be attached either on the bottom of the vehicle or on the axle, the wheel axles or the wheels themselves of the vehicle.

As will be readily apparent to those skilled in the art one of the moveable shutters a simple and effective control device for the moveable convergent shutter and the lateral, longitudinal bands associated therewith. The dispositions of these parts have been defined and described in the foregoing for these particular elements.

It has been noted that by using shaped cowls in order to streamline the openings of the depression chamber in the intake area of the convergent, a considerable improvement with very great consequent advantage and benefit can be obtained in the yield and efficacy of the device. This is manifest by significant increase in the vertical force developed by the device when the vehicle is in movement.

In a situation where the device includes a support placed within the intake area, the said support thus ends on an inclined divergent plane, at the extremity of which a moveable divergent shutter is freely hinged.

It is also well to note and take into account that the moveable shutter freely floats behind the support as long as the convergent shutter is not lowered towards the ground. On the other hand, as soon as the convergent shutter is lowered to the vicinity of the ground the considerable vacuum created by the depression chamber will attract and affect the divergent shutter and so conduct its free extremity to the vicinity of the ground. This tends to greatly decrease the escape area of the depression chamber.

It has also been demonstrated that the disposition indicated immediately above likewise makes it possible to improve the yield and efficacy of a last-described device according to the present invention for the reason that it maintains a certain number of advantages of the divergent feature of the general apparatus of the invention by avoiding the inconvenience which from the large length necessary for a theoretical divergent; this in essence being the result of the increase in the escape area of the depression chamber due to the excessive elongation of this latter.

Finally, it should be noted that in the case wherein an embodiment as last-described according to the present invention has only a single convergent, fixed shutter, the effect of the device is similar to the effect of an aileron. By analogy and explanation of this, it is already known how to use ailerons for the purpose of increasing the stability and adherence of automotive vehicles used in racing competition (i.e., "race cars"). However, the essential difference between conventional race cars and the device employed in practice of the present invention is that the aileron according to this invention which is constituted by the fixed shutter of the device employed is arranged in the immediate area of the ground. This, and with great advantage associated therewith, makes it possible to profit from a ground effect obtainable thereby (and not available with known race cars and the like) which considerably increases the efficacy and benefits of the device.

Finally, the present invention has amongst its objectives the provision of a new and improved vehicle, and in particular an automobile type of vehicle, characterized by the fact that it includes a device such as defined above for increasing its adherence to and traction upon and with the ground during operation.

Still further, the present invention has as another important objective the provision, as a new industrial product of an automobile vehicle characterized by the fact that it is equipped with and utilizes a device for improving the adherence and traction thereof at the time of and during forced deceleration or braking; such device on the vehicle being, as desired, any of the advantageous embodiments and variations thereof that are described in the foregoing and further illustrated in the following.

In order to better understand the several objectives, purposes and embodiments of the invention, and by way of demonstrating purely illustrative and non-limiting examples thereof, reference is had to the attached Drawing, wherein.

Figure 1:
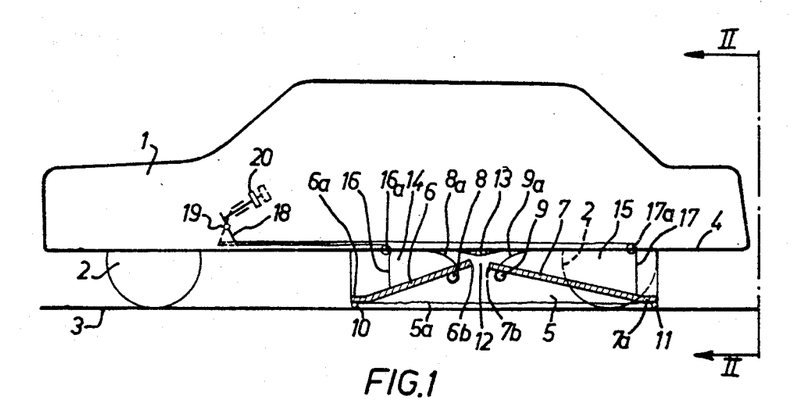
FIG. 1 represents a longitudinal cross-section according to I—I of FIG. 2 of a vehicle equipped with a device according to the first embodiment design of the invention, the movable flaps of the device being in the position that they occupy at the time of braking.
Figure 2:
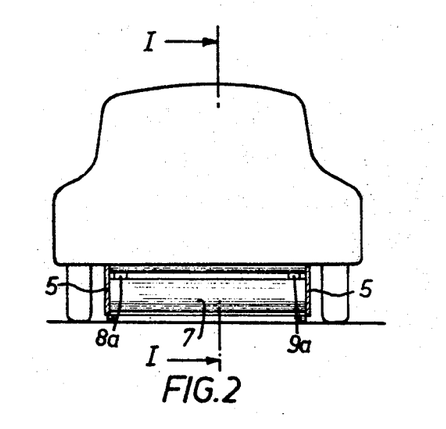
FIG. 2 represents a rear elevation view of the back of the vehicle of FIG. 1 taken along the line II—II of FIG. 1.
Figure 3:
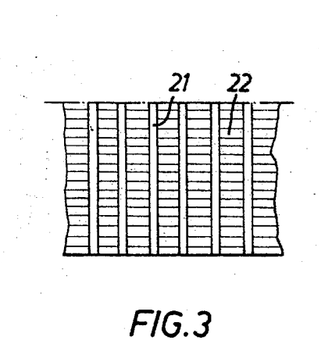
FIG. 3 represents, in broken out detail, a flat or plan view of one part of the movable flap of the device represented in FIGS. 1 and 2.

With initial reference to FIGS. 1 through 3, it will be seen that reference numeral 1 designates the frame of an automobile vehicle resting, through wheel 2 on the highway or other ground support surface 3. On the lower surface of the floorboard or bottom 4 of vehicle 1 there is longitudinally attached in the vicinity of the lateral surfaces of the car two flexible lateral bands, each numbered 5, made of rubbery material. Each lower edge 5a of the bands 5 is arranged so as to be at a distance of about 3 millimeters from the ground 3 when the vehicle is under an average load. Between the lateral bands 5 two rectangular movable flaps (or windows or shutters), 6 and 7, are arranged and articulated respectively around the transversal turning axles 8 and 9.

Axles 8 and 9 are positioned and located on the bottom 4 of vehicle 1. They support torsion springs 8a and 9a, respectively. The springs have one end of each connected to flaps 6 and 7 and the other end connected to bottom 4. The action of springs 8a and 9a is exerted in such a way that flaps 6 and 7 have a tendency to flatten out on the ground 3, by rotation around axles 8 and 9. Along the edges 6a and 7a, respectively, flaps 6 and 7 are equipped with small diameter friction rollers 10 and 11, respectively. The said rollers come into contact with the ground 3 when flaps 6 and 7 are pushed toward the ground by springs 8a and 9a; the distance between the edges 6a and 7a on the one hand, and the ground 3, on the other hand, is then roughly between about 5 and about 10 millimeters.

The numerals 6b and 7b, respectively, designate the edges of flaps 6 and 7 which are opposite the edges 6a and 7a. Between edges 6b and 7b an opening is located which connects between the volume defined on both sides by flaps 6 and 7. This opening is designated with the reference numeral 12. Centrally with respect to the opening 12, there is placed on the lower surface of the vehicle floorboard or bottom 4 a shaped cowl 13 having a roughly triangular section. The unit made up of the elements including bottom 4, cowl 13 and flaps 6 and 7 in lower position define a convergent dihedral 14 and a divergent dihedral 15 connected with one another by the deadend or throat or neck area located to the right of the cowl 13 and the opening 12.

The flaps 6 and 7 are maneuverable or adjustable in rotation around axles 8 and 9 by virtue and as a result of action of cables 16 and 17, respectively. Cables 16 and 17 respectively pass through pulleys 16a and 17a and are attached on one end to lever 18 which turns around a fixed point 19 that is integral with the frame of the vehicle. Lever 18 is moved and manipulated by the brake pedal 20 by means of the intermediary of a movable axle in an opening.

Flaps 6 and 7 are each made of logitudinal metallic bands 21 connected to one another transversely by means of bands made of rubbery material 22. The metallic bands 21 give flaps 6 and 7 a satisfactory longitudinal rigidity and the connecting bands 22, due to their flexibility, make it possible for flaps 6 and 7 to bend so as to possibly follow the imperfections of the highway or other ground surface 3 on which the vehicle is located and over which it travels.

When the driver of the vehicle is not depressing the brake pedal 20, the spring associated with this brake pedal maintains traction or a grip on cables 16 and 17 by means of lever 18. The corresponding position of brake pedal 20 is represented by dots in FIG. 1. Cables 16 and 17 exert a force which is opposite to the force of the torsion springs 8a and 9a. This assures that the flaps 6 and 7 are maintained in the upward position. In this upward position, the flaps 6 and 7 are arranged in a manner in which they are disposed so as to be roughly parallel to the floorboard 4 so as to be located in the vicinity of and in close proximity to this floorboard. No stress is applied to the vehicle itself because of or due to installation of apparatus according to the invention.

When the driver of the vehicle depresses the brake pedal 20 (this position of the pedal being represented by the solid line in FIG. 1), the displacement of lever 18 causes retractive movement of cables 16 and 17 so that movable flaps 6 and 7, under the influence and due to the action of torsion springs 8a and 9a, pivot around axles 8 and 9 respectively until the time that the rollers 10 and 11 are in contact with and supported by the ground 3. At this time, due to the forward movement and speed of the vehicle, the layers of masses of air located between ground 3 and floorboard 4 of the vehicle are forced into the convergent 14. The speed of these air masses rushing and being forced into the convergent increases up to the point of the dead-end or throat, that is to say, up to the area which is found to the right of the cowl 13. By means of a blasting effect, there is thus caused an aspiration of drawing-in or suction effect at and across the opening 12. This aspiration generates a depression on the inside of the depression chamber formed and delineated by the movable flaps 6 and 7, the lateral band 5 and the ground 3. This depression is all the greater and made so much more so since the play which exists between edges 5a, 6a and 7a on the one hand and the ground 3 on the other hand is less. As an illustration, one can estimate that for an automobile of average size traveling, at about 140 Kilometers (almost 90 miles) per hour and having a play on (or length of stroke from) the ground of a few millimeters, the depression created on the inside of the depression chamber is approximately some ten to a dozen grams per square centimeter. From this there results that it exerts an exertion of a vertical force directed towards the ground on the floorboard 4 of the vehicle, by means of and through the axles 8 and 9 of something on the order of several hundred kilograms. As is apparent, this force increases in a considerable way and amount the adherence of and traction to the ground of the automobile and makes it possible to greatly increase the efficacy of forced deceleration through braking of the car.

It should also be noted that the apparatus of the invention cooperates further in the braking properly speaking of the vehicle since the aspiration or suction energy of the air in the depression chamber actually acts on the kinetic energy of the vehicle. The form of flaps 6 and 7 makes it possible, due to the good thermal conductivity of metallic bands 21, to conveniently evacuate and dissipate heat that may be caused by friction with the ground of the said flaps during the braking period. Of course, the implacement and location of axles 9 and 8 on the vehicle is selected in such a way as to produce maximum efficacy of the adherence and tractional force created by the apparatus of the present invention.

Figure 4:
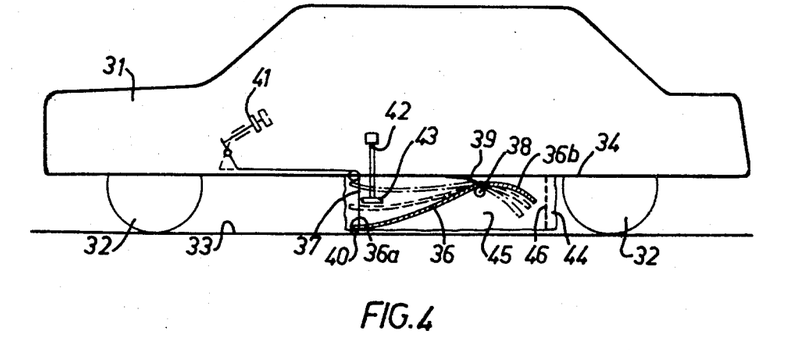
FIG. 4 represents a schematic longitudinal cross-section of the vehicle equipped with a device with a single movable flap, according to the second embodiment of the invention, this flap having two extreme positions and a single intermediary position.

With reference now to FIG. 4, the reference numeral 31 designates a complete automobile vehicle in accordance with the present invention. Vehicle 31, mounted on wheels 32, is situate on (for travel over) ground 33. A transversal axle 38 is attached to the bottom or floorboard 34 of the vehicle 31. Axle 38 is at least essentially horizontal and supports a movable flap 36. The forward edge 36a, equipped so as to be secured and strengthed with the wheel or roller 40, of flap 36 can come into contact with the ground. Flap 36 has on the side axle 38 which is opposite edge 36a, a shaped area 36b. When flap 36 is in lowered or full downward stroke (this being position represented by the solid line in the figure) it defines together with the floorboard of the vehicle 34, on the one hand, a convergent in the form of a dihedral placed in forward position with respect to the axle 38 and, on the other hand, a divergent placed behind axle 38. This divergent being as it actually is much shorter than the convergent and the two are separated by the dead-end zone or neck or throat area in the assembly.

Movable flap 36 is subject to the action of torsion spring 39 which tends to force it to the ground. The action of a cable 36 is manipulated or maneuvered by means of a brake pedal 41 of the vehicle. The spring of pedal 41 will assure traction of cable 37 so as to counteract the action of spring 39 and to place flap 36 in the position where its edge 36a will be found next to the floorboard 34. A fine mesh grill 46 is suspended from the bottom or floorboard 34 of the vehicle, the grill 46 is located in a generally, or at least roughly, vertical manner between the two lateral bands, each of which are numbered 44, in front of part 36b and flap 36.

A control or driving wheel 42, placed on the inside of the vehicle 31 permits the manipulation or moving of two cams or lifters, each of which are numbered 43, on which some lugs or stops not shown integral with flap 36 can be supported. This support or abutment makes it possible to maintain flap 36 in the intermediary position. Some flexible bands made up of rubbery material are arranged on both sides of the flap 36 and are each designated by the number 44. The bands 44 are parallel to the longitudinal axle of the vehicle.

Between bands 44, flap 36 and ground 33, a volume 45 is defined which constitutes the depression chamber of the apparatus according to the invention. This depression chamber 45 is open on its back part and the blasting effect is obtained because of the rushing flow of the air into the convergent-divergent marked off and delimited between the floorboard 34 and the flap 36. When this flap is placed into the lowered position, the mentioned blasting effect causes an aspiration or suction through the back part of the depression chamber 45 from which is created a vertical force thus increasing the support of the vehicle on and with the ground.

When the driver manipulates the driving wheel control 42, then the return of flap 36 under the action of the brake pedal spring is not accomplished until lifters 43 are completely extended. This intermediary position of flap 36 causes a lesser depression on the inside of chamber 45. However there is still obtained in this way a certain vertical thrust which makes it advantageously possible, for example, to increase the stability of the vehicle at high speeds.

Figure 5:
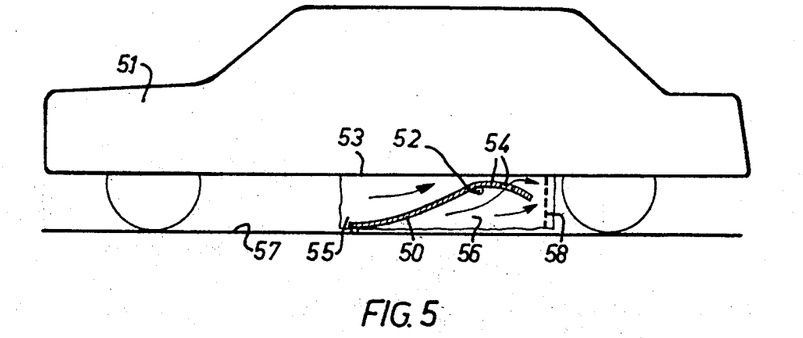
FIG. 5 represents a schematic longitudinal cross-section of the vehicle equipped with a single movable flap made up of openings in the dead-end area of it, according to the second embodiment of the invention.

By referring to FIG. 5, it can be seen that reference numeral 50 designates the only movable flap of the apparatus of the invention which is associated with vehicle 51. The control of this movable flap is accomplished in the same wqy as is indicated for the device in FIG. 4, the turning axle having been designated here by reference numeral 52. Flap 50 has a form analogous to the previously described flap 36 so that, together with floorboard bottom 53 of the vehicle, it delimits and defines a convergent/divergent unit having its dead-end zone or throat or neck area roughly to the right of axle 52. In the neck area in front of axle 52 there are openings 54 made in flap 50 which are arranged along the total width of flap 50; the latter being placed just, as above explained, between lateral flexible band 55. When flap 50 is placed in the lowered position, as is represented in FIG. 5, then it produces by means of the blasting effect in aspiration or suction of air by the air contained in depression chamber 56 which is defined between flap 50, the lateral band 55 and the ground 57. This aspiration is accomplished, first of all, by an opening 54 and, secondly, by the area behind chamber 56. Similar to what occurs in and with the device of FIG. 4, there is arranged between lateral band 55 a fine mesh grill 58. This grill is placed vertically and suspended on bottom or floorboard 53 of vehicle 51, the grill 58 being in front of the flap 50.

Figure 6:
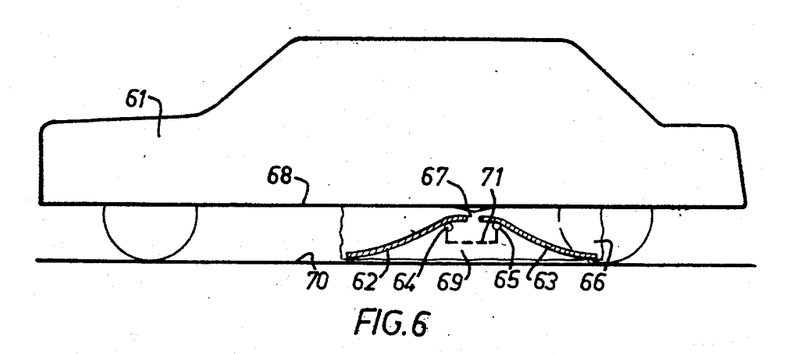
FIG. 6 represents a schematic longitudinal cross-section of a vehicle equipped with two movable flaps and a piece of protective mesh arranged to the right of the opening located in the upper part of the depression chamber.

With reference to FIG. 6, it will be seen that reference numeral 61 designates a complete vehicle which is equipped with a device according to the invention which includes two flaps 62 and 63, respectively which turn around two transversal axles 64 and 65, respectively, and are controlled by rotation around these axles by means analogous to those described in the embodiment shown in FIG. 4. Flaps 62 and 63 are located between two flexible lateral bands 66. In the area which is between the two turning axles 64 and 65, the flaps 62 and 63 are separated by an opening 67. When flaps 62 and 63 are placed into the lowered position, as is represented in FIG. 6, they define between themselves and the bottom 68 of vehicle 61 a convergent-divergent whose dead-end zone or neck area is found to the right of opening 67.

There is placed on the inside of depression chamber 69 (defined between flaps 62 and 63, the lateral bands 66 and ground 70) a fine mesh grill 71 which is supported by two axles 64 and 65 and which is located horizontally between these two axles. By means of the blasting effect in the dead-end or neck area of the convergent-divergent, there is obtained an aspiration or suction of the air from depression chamber 69 by means of opening 67. This air is filtered through the grill 71.

It has been demonstrated that in use of the three embodiments depicted in FIGS. 4, 5 and 6, wherein the grills 46, 58 and 71 are respectively present and employed, there is thereby assured an excellent filtration of the air which is exhausted from or taken out of the depression chambers 45, 56 and 69, respectively. This filtration permits the avoidance of particle ejection through the back or from the rear of the vehicle by making an exhaust from the depression chamber directly towards the ground.

In each of the three cases that are illustrated, one can verify an increase for the vehicle in adherence to and traction with the ground when the movable flap or flaps of the device are placed into the lower position. This makes it possible to increase the braking characteristics during forced deceleration. In case the movable flaps of the device are lowered into the intermediate position in the absence of any braking, it is possible, as has been mentioned, to increase in a permanent way the adherence to and traction with the ground of the vehicle and its stability when it is being operated at high rates of speed.

In FIGS. 7 through 10, reference numeral 80 designates the vehicle body which is equipped with apparatus according to the invention. The vehicle has four wheels, each numbered 81 which are equipped with tires 82. The housing 80 of the vehicle rests on tires 82 by means of the suspension components or devices which are supported, for the back area of the automobile, on two axle housings which, in turn, are connected to the rear differential or bridge 84. The two housings protect the axles 85 which drive and carry the two rear wheels 81.

On both sides of differential 84 there is arranged around the protective sheath or housing 83 a support designated in its entirety by the reference numeral 86. support 86 is made up of two plates 86a and 86b which surround the housing 83. The housing is made by means of a screw system 87 having inverse threads at their ends. Plate 86b has a boss 88 on the inside of which is a place for a cylinder 89. Support 86 is at least roughly parallel to the longitudinal axle of the automobile and the axle of the slot or pivot opening 89 is roughly perpendicular to the said longitudinal axle. The two openings 89 in the two supports 86 are roughly coaxial.

In each of the openings 89, a turning or articulation axle 80 is introduced. This axle is integral with the single movable flap or mobile window or shutter 91 of the heredescribed device according to the present invention. The turning axle 90 is held on and retained in the inside of opening 89 by means of several screws which pass through the boss 88 and penetrate on the ends of them into a circular opening 93 made in axle 90. The single movable flap 91 has, on both of its sides (in other words, in the vicinity of supports 86) an axle 90 similar to that described above; the movable flaps 91 being made flexibly by usage of a flexible material (such as that described for the embodiment shown in FIGS. 1 through 3) so that the mounting of axle 90 in bosses 88 presents no difficulty.

Figure 7:
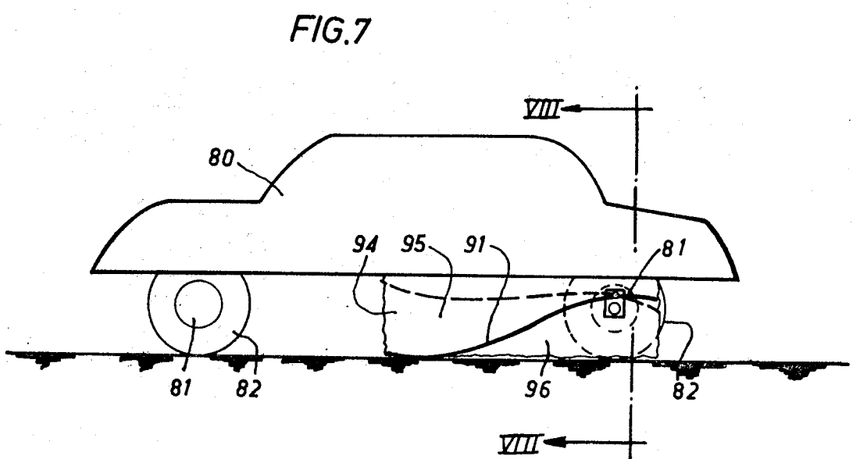
FIG. 7 schematically represents a longitudinal view of a vehicle equipped with a single movable flap whose turning axle is located on the rear axle of the wheels.
Figure 8:
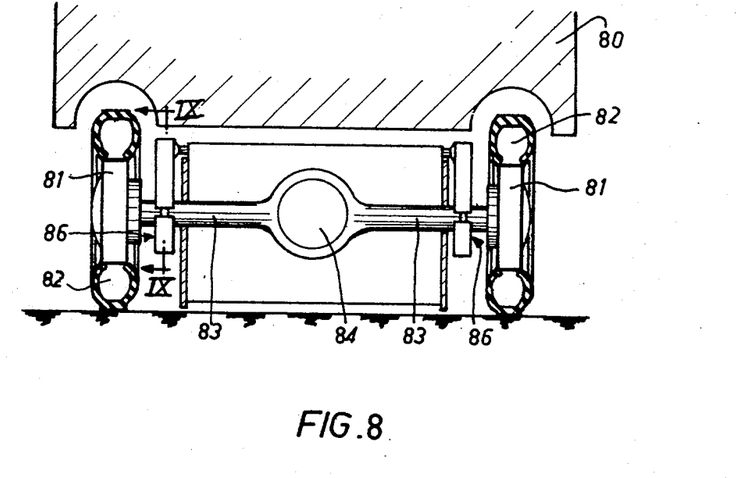
FIG. 8 schematically represents a view taken along the line VIII—VIII of FIG. 7.
Figure 9:
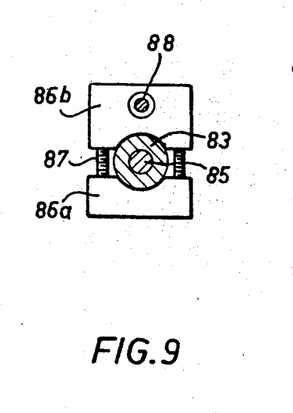
FIG. 9 represents a detailed view of the support of the turning axle of the movable flap taken along the line IX—IX of FIG. 8.
Figure 10:
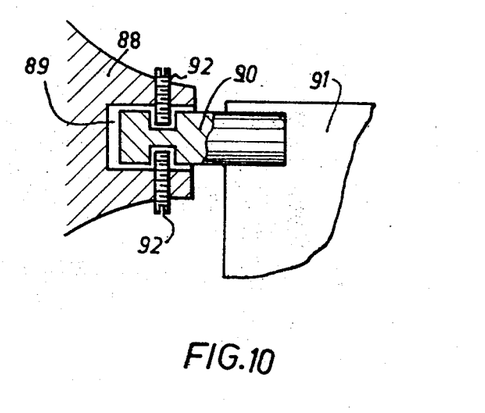
FIG. 10 represents, in detail, a partial cross-section of the turning axle arrangement of the movable flap of the vehicle of FIGS. 7 and 8.

On both sides of movable flap 91, flexible lateral bands 94 are placed, the lower parts of which are either very near to the ground or may even rub or scrape the ground. There is thus marked off or delimited, on the one hand, between the assembly comprised of the movable flaps 91, the bottom or floorboard of the vehicle 80 and the flexible lateral band 94 a convergent/divergent dihedral indicated by reference numeral 95 and, on the other hand, between the ground, the movable flap 91 and the flexible lateral bands 94 a depression chamber 96. The control of movable flap 91 is preferably associated with the control of the braking of the vehicle, as is herein described.

In FIG. 7, the position of the movable flap or mobile window 91, when the apparatus of the invention is in an inactive or non-working position, is represented in and with a dotted line.

The apparatus just above described functions in the same way as those of an analogous character shown and described in connection with FIGS. 1 through 6. When the flap 91 is in place in the full lowered stroke position indicated by the heavy line in FIG. 7, the forward displacement speed or movement of the vehicle causes masses of air to flow into the convergent. These are then evacuated into the divergent area. And, in the course of this air passage, an aspiration or suction is produced by means of a blasting effect in the depression chamber 96. This depression causes an aspiration or suction effect which results in a significant vertical force that is transmitted by means of and through the axle 90 and supports 86 to the tires 82 of the rear wheels 81 of the automobile. Under the effect and influence of this force, the rear wheels lightly scrape or tread on the ground so as to increase their contact surface with the ground and improves their adherence to and traction therewith.

It should be noted that this force is exerted only on the rear axle of the vehicle, thus making it possible to improve the distribution of the load on the four wheels during the forced deceleration involved in braking since, in the absence of this force, the rear axle would tend to raise or be thrust upward during the braking at least as a result of the preponderance of the braking which generally occurs on and with the front wheels and of the deceleration of the vehicle. In this way, a much more energetic and effective braking is achieved as a result of action of the device according to the present invention.

Figure 11:
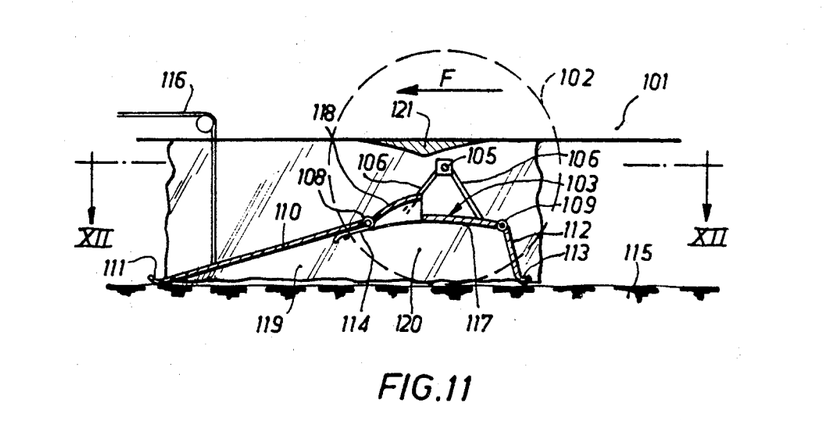
FIG. 11 represents in a longitudinal schematic cross-section of view, a further device according to the invention which includes two moveable shutters and a support with shaped cowls arranged in the intake area of the convergent, the cross-section having as its reference points XI—XI on FIG. 12.
Figure 12:
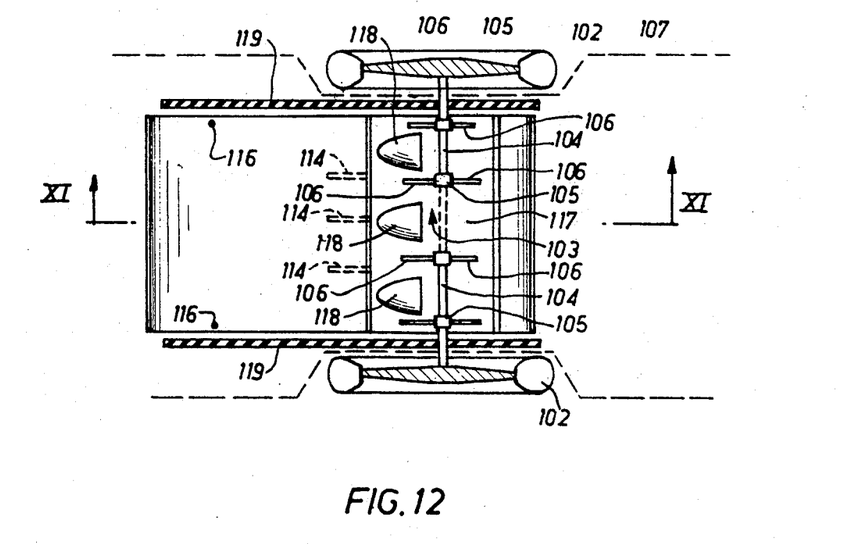
FIG. 12 represents a plan view, according to XII—XII of FIG. 11.

In referring to FIGS. 11 and 12, it will be seen that reference numeral 101 designates the bottom of the automobile vehicle on which the device according to the invention is provided. This device is placed in the vicinity of the back wheels of the vehicle. It is made up of a support designated by 103 in its aggregate. This support is attached to the rear wheel axles 104 by means of collars 105 and attachment struts 106. Support 103 extends over almost the total width of the vehicle; the edge of the body of which is represented schematically by the dotted line 107 in FIG. 12. At the front and back of support 103 in the longitudinal direction of the vehicle there are transversal hinge axles 108 and 109. Axle 108, which is arranged towards the front, makes possible the turning of movable shutter 110 whose free end 111 is curved upwards. Shutter 110 is subjected to the effect of several leaf springs 114. These tend to cause extremity 111 to come into contact with the ground 115. Likewise, the inverse effect of a traction cable 116 is controlled by the vehicle operator, as by use of a device analogous to that previously described for the purpose. Movable shutter 112 is free to rotate around its turning axle 109. Thus, when extremity 111 is near the ground 115, the angle formed between shutter 110 and the bottom 101 usually approximates 17°. When the extremity 113 of shutter 112 is near the ground 115, the angle formed by shutter 112 with the bottom 101 is approximately 70°.

Support 103 is made up essentially of two parts. The one arranged towards the back of the car is on an inclined plane 117 which usually forms an angle of about 7° with the bottom 101 of the vehicle. The other one that is disposed towards the front of the vehicle supports shaped cowls 118 which, when level, have the form of a shell whose point is directed toward the front of the vehicle. The direction of advance of the vehicle is marked off in FIG. 11 by the arrow F. The shaped cowls 118 are opened towards the back of the vehicle and make it possible to connect the volume between the bottom 101 and the support 103 on the one hand and, on the other hand, the volume between shutters 110 and 112 and the support 103 and the ground 115.

Along the total length of the vehicle, three shaped cowls 118 are arranged which assures for having three openings for communication between the two volumes mentioned above. On both sides of the device made up of shutters 110 and 112 and support 103 flexible, longitudinal bands 119 have been provided which come close to or in contact with the ground 115. The chamber constituted by shutters 110 and 112 and support 103, the ground 115 and the two longitudinal bands 119 has been designated by the reference numeral 120. To the right of the openings of the shaped cowls 118, the bottom 101 of the vehicle has a shaped cover 121.

When the operator of the vehicle equipped with a device according to the invention activates cables 116, shutter 110 goes into the lowered position. In other words, the extremity 111 approaches the ground 115. The streams of air between the ground 115 and the bottom of the vehicle 101 is thus caught up in the convergent defined by shutter 110 and the bottom 101 and these streams increase in speed up to the area of the collar situate to the right of hood 121 which is to the right of the openings of shaped cowls 118.

By this means, a pumping is produced of the air contained in the depression chamber 120. Under the effect of the depression which is created, shutter 112 turns around its axle 109 until the extremity 113 comes into contact with the ground 115. The existence of the depression created in chamber 120 generates a vertical force which is exerted on axles 104 and consequently on wheels 102 of the vehicle. It has been demonstrated, incidentally, that according to the displacement speeds of the vehicle, this vertical force can vary for ordinary-sized vehicles from between about 100 kg and about 2000 kg.

The presence of shaped cowls 118 is a considerably important factor in the marked improvement in yield or effect of a device according to the invention; the same being also the case for the presence of the inclined plane 117 of support 103. This inclined plane, in fact, defines a beginning of a divergent with very good yield and effectiveness and shutter 112 nevertheless makes it possible to limit the length of the divergent, which thereby limits the escape area of chamber 120 by reducing its length.

It has also been demonstrated that it is preferable to employ a ratio for the section to the entry of the convergent to the collar section a value of between about 1.5 and about 2, approximately.

Figure 13:
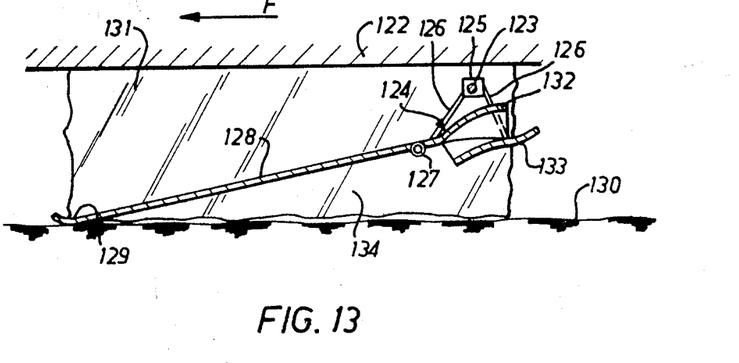
FIG. 13 represents, in longitudinal cross-section, a simplified variation of the design of FIGS. 11 and 12, the said variation including only one moveable convergent shutter and a support.

In FIG. 3, a simplified variation for embodiment of the process described previously is represented. In this variation, the bottom of the vehicle is designated by reference numeral 122 and the rear wheel axles by 123. The particular device shown includes a support designated by 124 in it aggregate. This support extends transversely along the total length of the vehicle and is supported upon shafts 123 by means of collars 125 and attachment struts 126. Towards the front of the vehicle, support 124 has an axle 127 around which movable shutter 128 turns whose free end 129 is curved upwards and can come into contact with the ground 130. On both sides of support 124 and shutter 128, flexible longitudinal bands 131 are provided and arranged.

Support 124 includes, regularly distributed along the length of the vehicle, some shaped cowls 123 identical to cowls 118 for the design represented in FIGS. 11 and 12. To the right of shaped cowls 132, some streamlined ailerons 133 are arranged. These are solidly connected to support 124. The cowls 132 and ailerons 133 define a passage having a suitable aerodynamic shape and make possible the aspiration of streams of air to the inside of chamber 134 as is defined by shutter 128, the ground 130 and the longitudinal bands 131. The shutter 128 which forms the convergent of this device is manuevered and controlled by a device analogous to the one which has been described for the design illustrated in FIGS. 11 and 12. In this variation, there exist no elements that define a divergent. While this simplifies considerable the construction, it also tends to decrease the yield and effectiveness of the device and the vertical force factors which can be obtained therewith.

The function of such a device is analogous to the one which has been described for the design of FIGS. 11 and 12. When the vehicle moves in the direction of arrow F with the shutter 128 being placed in the lowered position, the streams of air are forced into the convergent dihedral defined by shutter 128 and the bottom of the vehicle 122. This in the area of the openings of the shaped cowls 132 causes an aspiration and vacuum effect by means of the pumping effect on the inside of chamber 134 providing a depression within the chamber. This depression generates a vertical force which, by means and influence of the struts 126, is directed towards the axles of the wheel 123.

Figure 14:
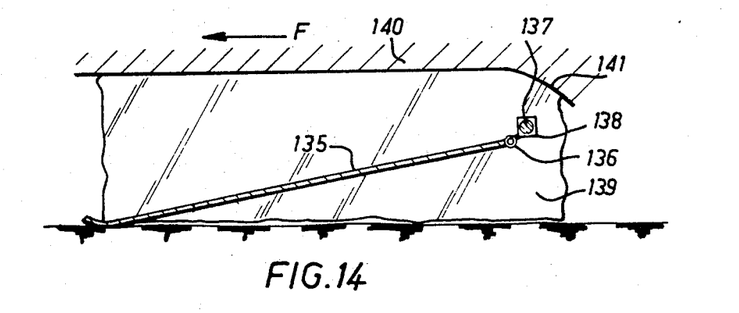
FIGS. 14 and 15 schematically represent longitudinal cross-sections of two other simplified variations of a device according to the invention wherein each of the two variations include only a convergent moveable shutter.
Figure 15:
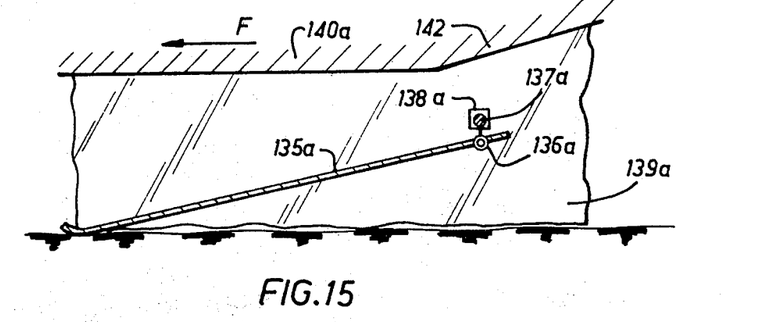

In FIGS. 14 and 15, two designs which are even more simplified are schematically represented for a device in accordance with the present invention. The displacement of the vehicle is represented by arrow F in these two figures.

In FIG. 14, the device is reduced to a movable shutter 135 turning around axle 136 supported by rear wheel axle 137 by means of an intermediary collar 138. The same elements are to be found again in FIGS. 14 and 15, although in FIG. 15 they are designated by the suffix a. Some lateral longitudinal bands have been provided along the total length of shutter 135 or 135a. These have been designated by the reference numerals 139 and 139a for FIGS. 14 and 15, respectively.

In FIG. 14, one can see that the bottom 140 of the vehicle is curved towards the bottom at point 141 from the intake area of the convergent defined by shutter 135, that is, from the area situated to the right of axle 136. The inclined zone 141 can be made up of a deflector attached to the bottom of the vehicle. The flow of air passing to the intake of the convergent is deflected towards the ground by deflector 141. This produces a pressure on the said deflector, but likewise and especially it also produces a supplementary depression on the lower surface of shutter 135. In this way the efficacy of the simplified device is increased.

In FIG. 15, the bottom 14a of the vehicle is, as shown, curved upwards and at surface 142 into the intake area, that is, at the right of axle 136a of the shutter 135a. The flow of air passing to the collar raises the surface 142 to a depression which adds its effect to that undergone by shutter 135a. One can thus also improve the efficacy of shutter 135a of this simplified variation of the device according to the invention.

It is understood that the embodiments described above are purely illustrative. They can be modified in many desirable ways in keeping with practice of the present invention. In particular, this especially applies to the simplified devices. Likewise, the shutters corresponding the convergent of the device can be made immovable so as to improve in a permanent way the stability and adherence to the ground of the vehicle, it being understood that in this case the drag of the device must be made minimal.

It is also, of course, to be further understood that the various features and elements involved in the above-described embodiments are in no way to be construed or regarded as limiting. They are all susceptible of many desirable modifications without departure from the spirit and scope of the invention. For example, apparatus according to the invention can be used not only on and with automobile vehicles, but, as is indicated in the foregoing, also on vehicles of any sort or nature which are capable of moving on highways, rails, or other sorts and types of terrain or ground supports. Accordingly, the invention is to be interpreted and liberally construed in the light of what is recited and set forth according to the definition and meaning of the hereto-appended claims.

What is claimed is:

1. Method for increasing traction and the adherence to the ground of vehicles having rotational elements for supporting and carrying the vehicle upon and over the ground, particularly automobile vehicles, said method comprising:
    creating under the lower part of the vehicle between its bottom and the supporting ground over which the vehicle is traveling while said vehicle is moving at any given rate of speed an extraordinary and greater-than-normal vacuum effect for said rate of speed of said vehicle;
    and at the same time utilizing said vacuum effect to increase the force and pressure of the vehicle upon and against the ground,
    whereby the traction and consequent stability of said vehicle traveling at said given rate of speed is increased upon and with respect to said ground,
    wherein said greater-than-normal vacuum effect is created by channeling at least a substantial part of the air masses passing under said vehicle through a zone of depression therefor under said vehicle between its bottom and the ground,
    said depression of said air masses inducing said vacuum effect.

2. A method according to the method of claim 1, wherein
    said vacuum effect is created towards the rear of the vehicle opposite the direction of travel of said vehicle.

3. A method according to the method of claim 1, wherein
    said vacuum effect is created while said vehicle is moving at the time and during the forced deceleration of said vehicle in the braking thereof.

4. A method according to the method of claim 1, wherein
    said vacuum effect is created, while said vehicle is moving;
    towards the rear end of the vehicle opposite the direction of travel of said vehicle; and
    at the time and during the forced decceleration of said vehicle in the braking thereof.

5. A method according to claim 1, wherein
    said vacuum effect is created so as to be primarily and in its major influence effective on and with the rear end of said vehicle.

6. Apparatus for increasing traction and adherance to the ground of a moving vehicle when it is travelling over ground on which it is supported at any given rate of speed, said apparatus comprising:
    a movable flap affixed to the lowermost part of the bottom of said vehicle,
    said flap having a front end and a rear end,
    means for rotatably affixing said flap by and at its rear end under and to the bottom of said vehicle so as to permit said flap to be moved upwardly and downwardly with respect to the bottom of said vehicle so that, when the front end of said flap is disposed in a position downward towards the ground, said flap defines a convergent form, at least approximately dihedrally-angled, intake arrangement for air passing under said vehicle in the movement over the ground of said vehicle, said convergent form being capable of initially compressing air passing therethrough during movement of the vehicle, and
    an air escape opening arranged at the rear end of said flap constructed to move said opening smaller than the air intake end of said flap when the front end of said flap is downwardly disposed so that air passing through said convergent form out of said opening is depressed whereby a vacuum effect is thereupon created between the bottom of the vehicle and the ground.

7. Apparatus in accordance with claim 6 including, in addition thereto and in combination therewith, lateral, longitudinal, flexible side walls between and connecting each of the lateral edges of said flap with and to the bottom of said vehicle which sidewalls enclose the convergent form of said flap and form an air compression passage chamber therewith when said flap is downwardly disposed.

8. The apparatus of claim 7, wherein
    said lateral, longitudinal side walls are comprised of flexible bands having their lower edges arranged at least in a position of immediate proximity with the ground when said flap is disposed in its extreme downward position.

9. Apparatus in accordance with claim 7, wherein
    said means for rotatably affixing said flap to the bottom of said vehicle is a turning axle upon which said flap is mounted at its rear end.

10. Apparatus in accordance with claim 7 including, in addition thereto and in combination therewith, means integral with and at the front end of said flap which are operable, when said flap is so greatly disposed downwardly as to contact the ground, to permit said front end of the flap to ride over and upon the ground while the vehicle is moving.

11. The apparatus of claim 10, wherein
    said means are in the form of skids that are adapted to scrape upon and over the ground when said vehicle is moving.

12. The apparatus of claim 10, wherein
said means are roller wheel elements adapted to ride over the ground when said vehicle is moving.

13. The apparatus of claim 6 including, in addition thereto and in combination therewith,
means associated with the braking mechanism of said vehicle for automatically moving said flap downwardly when the brakes of said vehicle are applied during forced deceleration thereof.

14. The apparatus of claim 13 in associated combination with an automobile.

15. The apparatus of claim 6 in associated combination with an automobile.

16. Apparatus for increasing traction and adherance to the ground of a moving vehicle when it is travelling over ground on which it is supported at any given rate of speed, said apparatus comprising:
a first movable flap and a second movable flap each rotatably affixed to the lowermost part of the bottom of said vehicle with each of said flaps having front ends and rear ends disposed respectively under the vehicle with relation to its direction of forward travel,
means for rotatably affixing each of said flaps by and at one of the ends of each under and to the bottom of said vehicle so as to permit each of said flaps to be moved upwardly and downwardly at their unaffixed ends with respect to the bottom of said vehicle,
the first movable flap being disposed under said vehicle ahead and to the front of the second movable flap with respect to the forward direction of travel of the vehicle, the said first movable flap being rotatably affixed by its rear end to the bottom of said vehicle so that, when the front end of said flap is disposed in a position downwards towards the ground, said flap defines a convergent form, at least approximately dihedrally-angled, intake arrangement for air passing under said vehicle in the movement over the ground of said vehicle, said convergent form being capable of initially compressing air passing therethrough during movement of the vehicle, the said second movable flap being rotatably affixed by its front end to the bottom of said vehicle so that, when the rear end of said flap is disposed in a position downwards towards the ground, said flap defines a divergent form, at least approximately dihedrally-angled, outlet arrangement for passing on air from the convergent form made by the downwardly-positioned first flap out towards the rear end of said vehicle,
an air escape opening arranged at the rear of said first flap constructed to have said opening smaller than the air intake end of said first flap when the front end of said first flap is downwardly disposed so that air passing through said convergent form out of its said opening is at least commenced to be depressed, an air inlet opening arranged at the front end of said second flap constructed to have said opening smaller than the air outlet end of said second flap when the rear end of said second flap is downwardly disposed so that air passing out of said divergent form is capable of expanding and at least substantially complete depression, the opening at the rear end of the first flap being in such relationship with the opening at the front end of the second flap that a connecting throat passage is formed for air to move from the divergent form formed by the first flap on and into the divergent form formed by the second flap, and the rear end of said first flap and the front end of said second flap being positioned in such spaced apart relationship in the area of said connecting throat passage that there is there provided an opening for air aspiration between the first flap and the second flap from the bottom of the vehicle to the ground so that air passing through said air throat passage is depressed whereby a vacuum effect is thereupon created between the bottom of the vehicle and the ground.

17. Apparatus in accordance with claim 16 including, in addition thereto and in combination therewith, lateral, longitudinal, flexible side walls between and connecting each of the lateral edges of each of said flaps with and to the bottom of said vehicle,
which sidewalls separately and respectively enclose the convergent form of said first flap and the divergent form of said second flap, so as
with said first flap to form an air compression passage chamber therewith when said first flap is downwardly disposed, and
with said second flap to form an air depression exhaust passage chamber therewith when said second flap is downwardly disposed.

18. The apparatus of claim 17, wherein
said lateral, longitudinal side walls are comprised of flexible bands having their lower edges arranged at least in a position of immediate proximity with the ground when said first and second flaps are disposed in their extreme downward positions.

19. Apparatus in accordance with claim 16 including, in addition thereto and in combination therewith,
a foraminous, particle blocking, protective grill section disposed over the bottom side towards the ground of said air-aspirating opening between said first and said second flaps.

20. The apparatus of claim 16 including, in addition thereto and in combination therewith,
means associated with the braking mechanism of said vehicle for automatically moving said first and second flaps downwardly when the brakes of said vehicle are applied during forced deceleration thereof.

21. The apparatus of claim 20 in associated combination with an automobile.

22. The apparatus of claim 16 in associated combination with an automobile.

23. The apparatus of claim 16, including at least one shaped cowl opening away from the direction of vehicle travel and in communication with space beneath said first flap.

24. The apparatus of claim 6, including at least one shaped cowl opening away from the direction of vehicle travel and in communication with space beneath said flap.

25. The apparatus of claim 16, wherein a plurality of cowls are employed with the cowls having the shape when viewed horizontally of a pointed shell with the point thereof being directed toward the front of the vehicle.

26. The apparatus of claim 6, wherein a plurality of cowls are employed with the cowls having the shape when viewed horizontally of a pointed shell with the point thereof being directed toward the front of the vehicle.

27. The apparatus of claim 6, wherein there is with the first flap, in addition thereto and in combination therewith, lateral, longitudinal, flexible side walls between and connecting each of the lateral edges of said flap with and to the bottom of said vehicle which sidewalls enclose the convergent form of said flap and form an air compression passage chamber therewith when said flap is downwardly disposed.

28. The apparatus of claim 25 including generally planar support means for the cowls which are in the form of an inclined plane, said lateral, longitudinal side walls being comprised of flexible bands having their lower edges arranged at least in a position of immediate proximity with the ground when said flap is disposed in its extreme downward position.

29. The apparatus of claim 28, wherein said means for rotatably affixing said flap to the bottom of said vehicle is a turning axle upon which said flap is mounted at its rear end.

30. The apparatus of claim 6, wherein the flap forms with the ground an angle of between about 15° and 20° when said flap is in the downward position.

31. The apparatus of claim 25, including an aileron in association with each cowl which favors aspiration through said cowl.

32. The apparatus of claim 25, wherein
said means are roller wheel elements adapted to ride over the ground when said vehicle is moving.

33. The apparatus of claim 25 including, in addition thereto and in combination therewith,
means associated with the braking mechanism of said vehicle for automatically moving said flap downwardly when the brakes of said vehicle are applied during forced deceleration thereof.

* * * * *